(12) United States Patent
Wu et al.

(10) Patent No.: US 12,497,475 B2
(45) Date of Patent: Dec. 16, 2025

(54) AQUEOUS POLYMER COMPOSITION AND METHOD OF PREPARING THEREOF

(71) Applicants: Dow Global Technologies LLC, Midland, MI (US); Rohm and Haas Company, Collegeville, PA (US)

(72) Inventors: Yan Wu, Shanghai (CN); Baoqing Zheng, Shanghai (CN); Fu Zhan, Shanghai (CN); Changkun Piao, Shanghai (CN); Juan Zhao, Shanghai (CN); Hao Hu, Shanghai (CN); Xiuqing Xu, Shanghai (CN); Jia Tang, Shanghai (CN); Dong Yun, Shanghai (CN)

(73) Assignees: DOW GLOBAL TECHNOLOGIES LLC, Midland, MI (US); DOW CHEMICAL (CHINA) INVESTMENT COMPANY LIMITED, Shanghai (CN); ROHM AND HAAS COMPANY, Collegeville, PA (US)

( * ) Notice: Subject to any disclaimer, the term of this patent is extended or adjusted under 35 U.S.C. 154(b) by 492 days.

(21) Appl. No.: 18/026,882

(22) PCT Filed: Oct. 10, 2020

(86) PCT No.: PCT/CN2020/120147
§ 371 (c)(1),
(2) Date: Mar. 17, 2023

(87) PCT Pub. No.: WO2022/073224
PCT Pub. Date: Apr. 14, 2022

(65) Prior Publication Data
US 2023/0331889 A1    Oct. 19, 2023

(51) Int. Cl.
| | | |
|---|---|---|
| *C08F 2/22* | (2006.01) |
| *C08F 220/18* | (2006.01) |
| *C08F 220/28* | (2006.01) |
| *C08F 230/02* | (2006.01) |
| *C08L 33/08* | (2006.01) |
| *C09D 133/08* | (2006.01) |

(52) U.S. Cl.
CPC .......... *C08F 220/1806* (2020.02); *C08F 2/22* (2013.01); *C08F 220/283* (2020.02); *C08F 230/02* (2013.01); *C08L 33/08* (2013.01); *C09D 133/08* (2013.01); *C08L 2201/52* (2013.01)

(58) Field of Classification Search
CPC .. C08F 220/1806; C08F 220/283; C08F 2/22; C08F 230/02; C08L 33/08; C08L 2201/52; C09D 133/08
USPC ....................................................... 524/556
See application file for complete search history.

(56) References Cited

U.S. PATENT DOCUMENTS

| | | | |
|---|---|---|---|
| 2014/0024743 A1 | 1/2014 | Flosbach et al. |
| 2021/0292455 A1* | 9/2021 | Wu ........ | C09D 5/022 |

FOREIGN PATENT DOCUMENTS

| | | |
|---|---|---|
| CA | 2048179 | 2/1992 |
| CN | 102993442 | 3/2013 |
| CN | 104356320 | 2/2015 |
| JP | 2010090323 A | 4/2010 |
| KR | 20110140016 A | 12/2011 |
| WO | 2020062019 | 4/2020 |

OTHER PUBLICATIONS

Brandrup, "Polymer Handbook", 1990, vol. 23, p. 277-280.

* cited by examiner

*Primary Examiner* — Kelechi C Egwim
(74) *Attorney, Agent, or Firm* — CANTOR COLBURN LLP

(57) ABSTRACT

An aqueous polymer composition comprises (A) a specific emulsion polymer comprising structural units of a cycloalkyl (meth)acrylate, structural units of an acetoacetoxy or acetoacetamide functional monomer, and structural units of a phosphorous acid monomer, a salt thereof, or mixtures thereof; and (B) a specific amount of a waterborne resin comprising at least one fatty acid ester segment and having a number average molecular weight of 20,000 g/mol or less, based on the total dry weight of the emulsion polymer and the waterborne resin. A coating composition comprising such aqueous polymer composition provides coatings made therefrom with improved anti-corrosion property.

14 Claims, No Drawings

AQUEOUS POLYMER COMPOSITION AND METHOD OF PREPARING THEREOF

FIELD OF THE INVENTION

The present invention relates to an aqueous polymer composition and a method of preparing the same.

INTRODUCTION

Solvent borne coating compositions comprising epoxy resins, polyurethane, or alkyd resins are widely used in metal protective coatings due to their anti-corrosion performance, mechanical properties and appearance. Waterborne acrylic polymer dispersions have much less environmental concerns than solvent borne dispersions and are usually used for light to medium duty metal protection. Black paints, typically comprising carbon black as the main pigment, are widely used for machine and equipment accessories coatings. In the manufacture of black paints via dispersion of carbon black, ball mill or sand mill has been traditionally used. Due to its hydrophobic and low density properties, carbon black is more difficult to wet and disperse well in water by the conventional dispersion treatment alone than inorganic pigments such as titanium dioxide. To facilitate wetting and dispersing of carbon black, large amounts of hydrophilic additives are typically added into black paints, which, however, hurt the anti-corrosion performance of the resultant paints. Thus, it is more challenging to improve corrosion resistance of black paints than paints with other colors. Moreover, direct-to-metal (DTM) coatings especially in rainy areas also require sufficient water resistance to avoid blisters caused by the rain, as blisters may also have negative impacts on appearance and anti-corrosion performance.

Therefore, there remains a need to provide an aqueous polymer composition particularly suitable for coatings with the above-described anti-corrosion properties.

SUMMARY OF THE INVENTION

The present invention provides a novel aqueous polymer composition particularly suitable for coating applications without the aforementioned problems. The aqueous polymer composition of the present invention comprises a novel combination of a specific emulsion polymer and a specific waterborne resin. The aqueous polymer composition can provide coatings including black paints with excellent corrosion resistance characterized by a maximum creep at scribe of 2 millimeters (mm) after at least 130 hours of exposure to salt spray. The aqueous polymer composition may also provide coatings with good early water resistance as measured according to the test method described in the Examples section below.

In a first aspect, the present invention is an aqueous polymer composition comprising,
(A) an emulsion polymer comprising, based on the weight of the emulsion polymer,
from 5% to 28% by weight of structural units of a cycloalkyl (meth)acrylate,
from 0.1% to 10% by weight of structural units of an acetoacetoxy or acetoacetamide functional monomer,
from 0.05% to 10% by weight of structural units of a phosphorous acid monomer, a salt thereof, or mixtures thereof,
from zero to 10% by weight of an additional ethylenically unsaturated acid monomer, and
structural units of an additional ethylenically unsaturated nonionic monomer; and
(B) from 0.7% to 7.8% by dry weight of a waterborne resin comprising at least one fatty acid ester segment and having a number average molecular weight of 20,000 grams per mole (g/mol) or less, based on the total dry weight of the emulsion polymer and the waterborne resin.

In a second aspect, the present invention is a method of preparing the aqueous polymer composition of the first aspect, by admixing the emulsion polymer with the waterborne resin.

In a third aspect, the present invention is a coating composition comprising the aqueous polymer composition of the first aspect and optionally a pigment.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

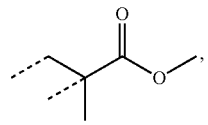

where the dotted lines represent the points of attachment of the structural unit to the polymer backbone.

"Fatty acid ester segment" herein refers to (i) the remnant of a fatty acid after esterification, or (ii) the remnant of an unsaturated fatty acid ester after polymerization, i.e., a structural unit of an unsaturated fatty acid ester. For example, a fatty acid ester segment derived from elaeostearic acid dimmer after esterification and a fatty acid ester segment derived from sulfated castor oil after polymerization (i.e., the structural unit of sulfated castor oil) are illustrated as (i-1) and (ii-1), respectively:

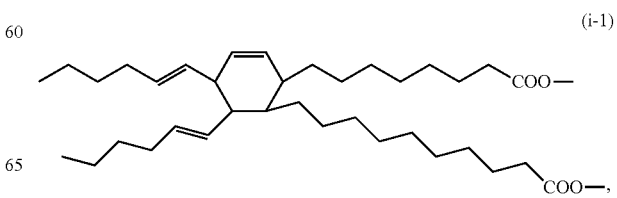

(ii-1)

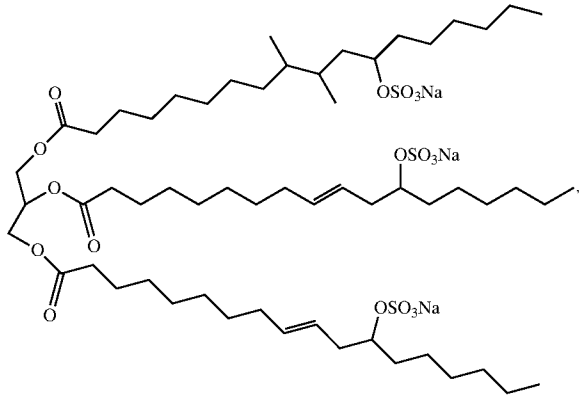

where the dotted lines represent the points of attachment of the segment to the resin backbone.

"Acrylic" monomer as used herein includes (meth)acrylic acid, alkyl (meth)acrylate, (meth)acrylamide, (meth)acrylonitrile and their modified forms such as hydroxy (meth) alkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" as used herein can be measured by various techniques including, for example, differential scanning calorimetry ("DSC") or calculation by using a Fox equation. The particular values of Tg reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of monomer $M_1$, and $T_g(M_2)$ is the glass transition temperature of the homopolymer of monomer $M_2$, all temperatures being in K. The glass transition temperatures of the homopolymers may be found, for example, in "Polymer Handbook", edited by J. Brandrup and E. H. Immergut, Interscience Publishers.

The aqueous polymer composition of the present invention comprises one or more emulsion polymer. The emulsion polymer useful in the present invention comprises structural units of one or more cycloalkyl (meth)acrylate. Examples of suitable cycloalkyl (meth)acrylates include cyclohexyl (meth)acrylate, methcyclohexyl (meth)acrylate, isobornyl (meth)acrylate, dihydrodicyclopentadienyl (meth)acrylate, trimethylcyclohexyl (meth)acrylate, t-butyl (meth)cyclohexyl acrylate, or mixtures thereof. Preferred cycloalkyl (meth)acrylates include cyclohexyl methacrylate, cyclohexyl acrylate, methcyclohexyl acrylate, or mixtures thereof. The emulsion polymer may comprise structural units of the cycloalkyl (meth)acrylate in an amount of 5% or more, 6% or more, 7% or more, 8% or more, 9% or more, 10% or more, 11% or more, 12% or more, 13% or more, 14% or more, or even 15% or more, and at the same time, 28% or less, 27% or less, 26% or less, 25% or less, 24% or less, 23% or less, 22% or less, 21% or less, or even 20% or less, by weight based on the weight of the emulsion polymer. "Weight of the emulsion polymer" herein refers to the dry weight of the emulsion polymer.

The emulsion polymer useful in the present invention may comprise structural units of one or more acetoacetoxy or acetoacetamide functional monomer. Acetoacetoxy or acetoacetamide functional monomers are monomers having an ethylenically unsaturation and one or more acetoacetyl moieties represented by:

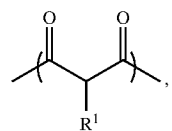

wherein $R^1$ is hydrogen, an alkyl having 1 to 10 carbon atoms, or phenyl.

Examples of suitable acetoacetoxy or acetoacetamide functional groups include

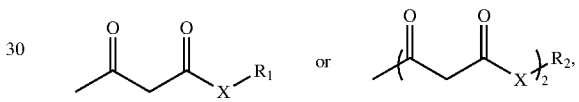

wherein X is O or N, $R_1$ is a divalent radical and $R_2$ is a trivalent radical, that attach the acetoacetoxy or acetoacetamide functional group to the backbone of the emulsion polymer.

Suitable acetoacetoxy or acetoacetamide functional monomers may include, for example, acetoacetoxyalkyl (meth)acrylates such as acetoacetoxyethyl methacrylate (AAEM), acetoacetoxyethyl acrylate, acetoacetoxypropyl methacrylate, acetoacetoxybutyl methacrylate, and 2,3-di(acetoacetoxy)propyl methacrylate; allyl acetoacetate; vinyl acetoacetate; acetoacetamidoalkyl (meth)acrylates such as acetoacetamidoethyl methacrylate and acetoacetamidoethyl acrylate; or combinations thereof. The emulsion polymer may comprise structural units of the acetoacetoxy or acetoacetamide functional monomer in an amount of 0.1% or more, 0.3% or more, 0.5% or more, 0.8% or more, 1% or more, 1.2% or more, 1.5% or more, 1.8% or more, 2% or more, 2.2% or more, 2.5% or more, 2.8% or more, 3% or more, or even 3.2% or more, and at the same time, 10% or less, 9% or less, 8% or less, 7% or less, 6% or less, 5% or less, 4.5% or less, 4% or less, 3.8% or less, 3.6% or less, or even 3.4% or less, by weight based on the weight of the emulsion polymer.

The emulsion polymer useful in the present invention may comprise structural units of one or more phosphorous acid monomer, a salt thereof, or mixtures thereof. Phosphorous acid monomers may have an ethylenically unsaturation. The phosphorous acid monomers can be dihydrogen phosphate esters of an alcohol in which the alcohol contains or is substituted with a polymerizable vinyl or olefinic group. The phosphorous acid monomers and salts thereof may include phosphoalkyl (meth)acrylates such as phosphoethyl (meth)acrylate, phosphopropyl (meth)acrylate, phosphobutyl (meth)acrylate, salts thereof, and mixtures thereof; $CH_2=C$ ($R_{p1}$)—C(O)—O—($R_{p2}$O)$_q$—P(O)(OH)$_2$, wherein $R_{p1}$=H or CH$_3$, $R_{p2}$=alkylene, such as an ethylene group, a propylene group, or a combination thereof; and q=1-20, such as SIPOMER PAM-100, SIPOMER PAM-200, SIPOMER PAM-300 and SIPOMER PAM-600 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, or mixtures thereof. Preferred phosphorus acid monomers are selected from the group consisting of phosphoethyl methacrylate (PEM), phosphoethyl acrylate, allyl ether phosphate, or mixtures thereof; more preferably, phosphoethyl methacrylate. The emulsion polymer may comprise structural units of the phosphorous acid monomer, salt thereof, or mixtures thereof in an amount of 0.05% or more, 0.1% or more, 0.2% or more, 0.3% or more, 0.5% or more, 0.6% or more, 0.8% or more, 1.0% or more, 1.2% or more, 1.3% or more, 1.4% or more, or even 1.5% or more, and at the same time, 10% or less, 7% or less, 5% or less, 4.5% or less, 4% or less, 3.5% or less, 3.2% or less, 3% or less, 2.8% or less, 2.5% or less, 2% or less, or even 1.8% or less, by weight based on the weight of the emulsion polymer.

The emulsion polymer useful in the present invention may comprise structural units of one or more additional ethylenically unsaturated acid monomer, a salt thereof, or mixtures thereof, that is other than the phosphorous acid monomer or salt thereof. The additional ethylenically unsaturated acid monomer can be carboxylic acid monomers, sulfonic acid monomers, or mixtures thereof. The carboxylic acid monomers can be α,β-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. Specific examples of α,β-ethylenically unsaturated carboxylic acids include acrylic acid, methacrylic acid, maleic acid, itaconic acid, crotonic acid, fumaric acid, 2-carboxyethyl acrylate, or mixtures thereof. The sulfonic acid monomers may include sodium vinyl sulfonate (SVS), sodium styrene sulfonate (SSS) and acrylamido-methyl-propane sulfonate (AMPS); salts thereof; or mixtures thereof. Preferably, the additional ethylenically unsaturated acid monomer is the α,β-ethylenically unsaturated carboxylic acid, for example, acrylic acid, methacrylic acid, itaconic acid, or mixtures thereof. The emulsion polymer may comprise structural units of the additional acid monomer and salt thereof in an amount of zero or more, 0.5% or more, 0.8% or more, 1% or more, 1.2% or more, 1.5% or more, 1.8% or more, or even 2% or more, and at the same time, 10% or less, 7% or less, 5% or less, 4.5% or less, 4% or less, 3.5% or less, 3% or less, or even 2.5% or less, by weight based on the weight of the emulsion polymer.

The emulsion polymer useful in the present invention may comprise structural units of one or more ethylenically unsaturated functional monomer having one or more functional groups selected from ureido, amide, amino, silane, hydroxyl, or combinations thereof, that is other than the above monomers. These ethylenically unsaturated functional monomers may include, for example, amino-functional monomers such as dimethylaminoethyl methacrylate, dimethylaminoethyl acrylate, dimethylaminopropyl methacrylate, dimethylaminopropyl acrylate; monomers bearing amide-functional groups such as acrylamide and methacrylamide; vinyltrialkoxysilanes such as vinyltrimethoxysilane, vinyltriethoxysilane, vinyltris(2-methoxyethoxy)silane, vinyldimethylethoxysilane vinylmethyldiethoxysilane or (meth)acryloxyalkyltrialkoxysilanes such as (meth)acryloxyethyltrimethoxysilane and (meth)acryloxypropyltrimethoxysilane; ureido-functional monomers; hydroxyl-functional monomers such as 2-hydroxyethyl acrylate, 2-hydroxyethyl methacrylate, 2-hydroxypropyl methacrylate, and 3-hydroxybutyl methacrylate; or mixtures thereof. Preferably, the ethylenically unsaturated functional monomer is a ureido-functional monomer. As used herein, the term "ureido-functional monomer" refers to an ethylenically unsaturated compound comprising a cyclic ureido group (i.e., an imidazolidin-2-one group). The ureido-functional monomer may include cyclic-ureido-group-containing alkyl esters of (meth)acrylic acids. Examples of suitable ureido-functional monomers include N-(2-methacrylamidoethyl) ethylene urea, N-(2-methacryloyloxyethyl) ethylene urea, N-(maleate diethyl) ethylene urea, or mixtures thereof. Preferred ureido-functional monomer is N-(2-methacryloyloxyethyl) ethylene urea. The emulsion polymer may comprise structural units of the ethylenically unsaturated functional monomer in an amount of zero or more, 0.1% or more, 0.2% or more, 0.3% or more, 0.4% or more, 0.5% or more, 0.6% or more, or even 0.7% or more, and at the same time, 3% or less, 2.5% or less, 2% or less, 1.5% or less, 1.1% or less, 1% or less, 0.9% or less, or even 0.8% or less, by weight based on the weight of the emulsion polymer.

The emulsion polymer useful in the present invention may comprise structural units of one or more additional ethylenically unsaturated nonionic monomer that is other than the cycloalkyl (meth)acrylate, the acetoacetoxy or acetoacetamide functional monomer, and the ethylenically functional monomer. "Nonionic monomer" herein refers to a monomer that does not bear an ionic charge between pH=1-14. Ethylenically unsaturated nonionic monomers may include $C_1$-$C_{24}$-alkyl (meth)acrylates such as $C_4$-$C_{24}$-alkyl (meth) acrylates, styrene, substituted styrene, (meth)acrylonitrile, or mixtures thereof. $C_1$-$C_{24}$-alkyl (meth)acrylates refer to alkyl esters of (meth)acrylic acids containing alkyl with from 1 to 24 carbon atoms. Examples of suitable additional ethylenically unsaturated nonionic monomers include methyl methacrylate, ethyl (meth)acrylate, 2-ethylhexyl (meth)acrylate, butyl (meth)acrylate, tert-butyl (meth)acrylate, lauryl (meth)acrylate, or mixtures thereof. The additional ethylenically unsaturated nonionic monomer may comprise any one or any combination of more than one type of the ethylenically unsaturated nonionic monomers selected from styrene, substituted styrene, $C_4$-$C_{24}$-alkyl (meth)acrylates, or mixtures thereof. The emulsion polymer may comprise structural units of the additional ethylenically unsaturated nonionic monomer in an amount of 42% or more, 45% or more, 50% or more, 55% or more, or even 60% or more, and at the same time, 94% or less, 90% or less, 85% or less, 80% or less, 75% or less, 70% or less, or even 65% or less, by weight based on the weight of the emulsion polymer.

The emulsion polymer useful in the present invention may comprise structural units of one or more polymerizable surfactant. The polymerizable surfactant may contain at least one carbon-carbon double bond. The polymerizable surfactant may have the structure of formula (I),

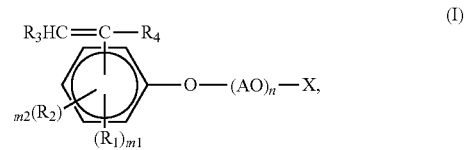

wherein $R_1$ is a phenyl group or

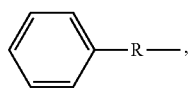

where R is an alkylene group; m1 is an integer from 0 to 4, for example, 0, 1, 2, 3 or 4, preferably from 1 to 3; $R_2$ is an alkyl or a substituted alkyl, preferably a $C_1$-$C_4$ alkyl or a substituted $C_1$-$C_4$ alkyl; m2 is 0 or 1; $R_3$ is hydrogen or a $C_1$-$C_{20}$ or $C_1$-$C_4$ alkyl group such as methyl; $R_4$ is hydrogen or a $C_1$-$C_{20}$ or $C_1$-$C_4$ alkyl group such as methyl; A represents an alkylene group or a substituted alkylene group, having 2 to 4 carbon atoms; n represents an average addition mole number of alkylene oxide and is an integer in the range of from 0 to 1,000, from 1 to 100, from 2 to 60, from 3 to 50, or from 4 to 40; and X represents hydrogen or an anionic hydrophilic group selected from —$(CH_2)_a$—$SO_3M$, —$(CH_2)_b$—COOM, —$PO_3M_2$, —$P(Z)O_2M$, or —CO—$CH_2$—$CH(SO_3M)$—COOM, wherein a and b are each independently an integer of from 0 to 4, Z represents a residual obtained by removing X from the general formula (I), and each M represents hydrogen, an alkali metal atom, an alkaline earth metal atom, an ammonium residue, or an alkanolamine residue.

In formula (I), $R_1$ can be

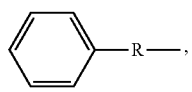

where R can be an alkylene group having from 1 to 4 carbon atoms, preferably having from 2 to 3 carbon atoms, such as for example, —$CH_2$—, —$CH(CH_3)$—, or —$C(CH_3)_2$—. Preferred $R_1$ is

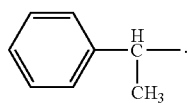

Preferably, m1 is 2 or 3. In formula (I), A can be an ethylene group (—$CH_2CH_2$—). n can be an integer ranging from 4 to 40 or from 5 to 20. Preferred X is —$SO_3M$. Preferably, M is $NH_4^+$. Specific examples of the polymerizable surfactants may include the following structure:

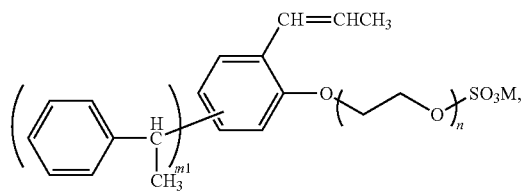

wherein m1 and n are as defined above in formula (I), and M is $Li^+$, $Na^+$, $K^+$, or $NH_4^+$. Suitable commercially available polymerizable surfactants may include Hitenol AR-1025 from DKS Co., Ltd. The emulsion polymer useful in the present invention may comprise structural units of the polymerizable surfactant in an amount of zero or more, 0.5% or more, 0.7% or more, 0.9% or more, 1.1% or more, or even 1.2% or more, and at the same time, 10% or less, 7% or less, 5% or less, 3% or less, 2% or less, 1.5% or less, or even 1.3% or less, by weight based on the weight of the emulsion polymer.

The emulsion polymer useful in the present invention may optionally comprise structural units of one or more multi-ethylenically unsaturated monomer including di-, tri-, tetra-, or higher multifunctional ethylenically unsaturated monomer, that is other than the above monomers. Examples of suitable multiethylenically unsaturated monomers include butadiene, allyl (meth)acrylates, divinyl benzene, ethylene glycol dimethacrylate, butylene glycol dimethacrylate, or mixtures thereof. The emulsion polymer may comprise, by weight based on the weight of the emulsion polymer, from zero to 5% of structural units of the multiethylenically unsaturated monomer, for example, 3% or less, 2% or less, 1% or less, 0.5% or less, 0.1% or less or even zero.

The emulsion polymer useful in the present invention may comprise, by weight based on the weight of the emulsion polymer, from 10% to 25% of structural units of the cycloalkyl (meth)acrylate; from 1.5% to 4% of structural units of the acetoacetoxy or acetoacetamide functional monomer; from 1.5% to 4% of structural units of the phosphorous-containing acid monomer, salt thereof, or mixtures thereof; and structural units of the additional ethylenically unsaturated nonionic monomer; and optionally, from zero to 3% of structural units of the ethylenically unsaturated functional monomer.

Total weight concentration of structural units in the emulsion polymer is equal to 100%. Types and levels of the monomers above for preparing the emulsion polymer may be chosen to provide the emulsion polymer with a glass transition temperature ($T_g$) suitable for various applications. The $T_g$ of the emulsion polymer may be 0° C. or higher, 5° C. or higher, 10° C. or higher, 15° C. or higher, 20° C. or higher, 25° C. or higher, or even 30° C. or higher, and at the same time, 60° C. or less, 55° C. or less, 50° C. or less, 47° C. or less, 44° C. or less, or even 40° C. or less, as calculated by the Fox equation.

The emulsion polymer useful in the present invention may have a number average molecular weight (Mn) of 10,000 g/mol or more, for example, 15,000 g/mol or more, 20,000 g/mol or more, 25,000 g/mol or more, 30,000 g/mol or more, 35,000 g/mol or more, 40,000 g/mol or more, 45,000 g/mol or more, 50,000 g/mol or more, or even 55,000 g/mol or more, and at the same time, 1000,000 g/mol or less, 800,000 g/mol or less, 600,000 g/mol or less, 400,000 g/mol or less, 300,000 g/mol or less, 200,000 g/mol or less, 150,000 g/mol or less, 120,000 g/mol or less, 100,000 g/mol or less, 80,000 g/mol or less, 70,000 g/mol or less, 65,000 g/mol or less, or even 60,000 g/mol or less. Molecular weight of the emulsion polymer may be measured by Gel Permeation Chromatography (GPC) as described in the Examples section below.

The emulsion polymer useful in the present invention may be prepared by emulsion polymerization of a mixture of the monomers described above ("monomer mixture"). Total concentration of the monomers in the monomer mixture for preparing the emulsion polymer is equal to 100%. For each monomer, the weight concentration of a monomer in the monomer mixture (that is, based on the total weight of the monomer mixture) is the same as the above described weight concentration of structural units of such monomer in the emulsion polymer (that is, based on the weight of the emulsion polymer). The monomer mixture may be added neat or as an emulsion in water; or added in one or more additions or continuously, linearly or nonlinearly, over the reaction period of preparing the emulsion polymer. The monomer mixture may be added neat or as an emulsion in water; or added in one or more additions or continuously, linearly or nonlinearly, over the reaction period of preparing the polymer. Temperature suitable for free-radical polymerization process may be lower than 100° C., in the range of from 10 to 99° C. or in the range of from 50 to 90° C. One or more surfactants, preferably, the polymerizable surfactant, may be used in preparing the polymer.

One or more radical initiator may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01% to 3.0% by weight, based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the proceeding acids. Metal salts of iron, copper, manganese, silver, platinum, vanadium, nickel, chromium, palladium, or cobalt may be used to catalyze the redox reaction. Chelating agents for the metals may optionally be used.

One or more chain transfer agent may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans such as hydroxyethyl mercaptan, mercaptopropionic acid, and mixtures thereof. The chain transfer agent may be used in an amount of from zero to 2%, for example, 1.5% or less, 1% or less, 0.5% or less, 0.3% or less, 0.2% or less, or even 0.15% or less, by weight based on the total weight of the monomers (that is, the monomer mixture) used for preparing the emulsion polymer.

After completing the polymerization, the obtained aqueous dispersion may be neutralized by one or more bases as neutralizers to a pH value, for example, at least 5, from 6 to 12, from 7 to 10, or from 8 to 9. The bases may lead to partial or complete neutralization of the ionic or latently ionic groups of the emulsion polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. The emulsion polymer particles in the aqueous dispersion may have a particle size of 50 nanometers (nm) or more, 80 nm or more, or even 90 nm or more, and at the same time, 500 nm or less, 200 nm or less, or even 150 nm or less. The particle size herein refers to Z-average size and may be measured by a Brookhaven BI-90 Plus Particle Size Analyzer.

The aqueous polymer composition of the present invention may comprise the emulsion polymer in an amount of 92.2% or more, 92.3% or more, 92.4% or more, 92.5% or more, 92.6% or more, 92.7% or more, 92.8% or more, 93% or more, 93.2% or more, 93.5% or more, 93.8% or more, 94% or more, 94.2% or more, 94.5% or more, 94.8% or more, or even 95% or more, and at the same time, 99.3% or less, 99.2% or less, 99.1% or less, 99% or less, 98.8% or less, 98.5% or less, 98.2% or less, or even 98% or less, by weight based on the total dry weight of the emulsion polymer and the waterborne resin described below.

The aqueous polymer composition of the present invention also comprises one or more waterborne resin containing at least one fatty acid ester segment, that is other than the emulsion polymer above. "Waterborne resin" herein refers to a resin that can be soluble or dispersible in water. The waterborne resin useful in the present invention can be a waterborne epoxy ester, an unsaturated fatty acid ester modified acrylic copolymer, or a mixture thereof.

The waterborne epoxy ester useful in the present invention may contain one or more fatty acid ester segment. The fatty acid ester segment can be formed by reacting an epoxy compound with a fatty acid, preferably, an unsaturated fatty acid. The waterborne epoxy ester may comprise a reaction product of an epoxy compound with an unsaturated fatty acid, and optionally, an additional carboxylic acid group-containing compound that is other than an unsaturated fatty acid. One or more solvent such as butanol, dimethylbenzene, 2-butoxy-1-ethanol monobutyl ether, ethylene glycol monoethyl ether, or mixtures thereof is typically used to diluent the reaction product. Epoxy groups in the epoxy compound can react with carboxylic acid groups in the unsaturated fatty acid by condensation reaction to form at least one unsaturated fatty acid ester segment in the waterborne epoxy ester (i.e., the remnant of an unsaturated fatty acid after esterification). The epoxy compound can be an aliphatic, aromatic, or cycloaliphatic epoxy compound, or mixtures thereof. Suitable epoxy compounds may include, for example, diglycidyl ethers of bisphenol A, diglycidyl ethers of bisphenol F, diglycidyl ethers of bi-alcohols, diglycidyl ethers of polyglycols, diglycidyl ethers of polypropylene glycols, or mixtures thereof. The unsaturated fatty acid may contain from 6 to 36 carbon atoms, from 6 to 30 carbon atoms, from 8 to 24 carbon atoms, or from 8 to 18 carbon atoms. Examples of suitable unsaturated fatty acids include soya oil acid, lauric acid, cocinic acid, eleostearic acid, tung oil fatty acid, linseed oil fatty acid, dehydrated castor oil fatty acid, dimers or oligomers thereof, or mixtures thereof. When the unsaturated fatty acid used for preparing the waterborne epoxy ester is a monocarboxylic acid, the obtained epoxy ester may comprise the segment having the structure of formula (IIa):

$$C_{na}H_{ma}O_2— \hspace{2cm} \text{(IIa)},$$

where na is an integer of from 6 to 18, and ma=2na-3, 2na-5 or 2na-7.

When the unsaturated fatty acid used for preparing the waterborne epoxy ester is an unsaturated fatty acid dimmer, the obtained epoxy ester may comprise the segment having the structure of formula (IIb):

  (IIb), where nb is an integer of from 10 to 36, and mb=2nb-4, 2nb-6, 2nb-8, 2nb-10 or 2nb-12.

The additional carboxylic acid-group-containing compound useful for preparing the epoxy ester may include ethylenically unsaturated carboxylic acid monomers than can be monocarboxylic acids or dicarboxylic acids, a polyacrylic acid, a polyacrylate containing carboxylic acid groups, or mixtures thereof. The carboxylic acid monomer may include those described in the emulsion polymer section above, particularly, (meth)acrylic acid. Preferably, the epoxy ester is an (meth)acrylic acid functionalized epoxy ester. In the reaction of forming the epoxy ester, the mole ratio of carboxylic acid groups to epoxy groups in the reactants may be in the range of from 10:1 to 1:1, from 5:1 to 1:1, from 2:1 to 1:1, from 1.8:1 to 1:1, from 1.5:1 to 1:1, or from 1.2:1 to 1:1. The epoxy ester resin may be further modified by an $\alpha,\beta$-ethylenically unsaturated dicarboxylic acid and/or an anhydride thereof through addition reaction with double bond(s) in the epoxy ester (that is, forming carboxylic acid groups), and then may be further neutralized by ammonia and/or an amine to a pH value greater than 9 or 9.5 or more. Suitable $\alpha,\beta$-ethylenically unsaturated dicarboxylic acids may include, for example, maleic anhydride, fumaric acid, itaconic acid, or mixtures thereof. Suitable amines may include, for example, ethanolamine, triethanolamine, dimethylethanolamine, 1,6-diaminohexane, ethylenediamine, triethylethylenediamine, phenylenediamine, or mixtures thereof. The obtained waterborne epoxy ester may comprise the solvent, typically used in the reaction for preparing the waterborne epoxy ester, for example, in an amount of 5% or more, 10% or more, 15% or more, 17% or more, or even 19% or more, and at the same time, 30% or less, 25% or less, or even 20% or less, by weight based on the wet weight of the waterborne epoxy ester.

The waterborne resin useful in the present invention may comprise an unsaturated fatty acid ester modified acrylic copolymer (hereinafter "modified acrylic copolymer"). Such copolymer can be prepared by polymerization of an unsaturated fatty acid ester and one or more acrylic monomer comprising acrylic acid, methacrylic acid, or mixtures thereof. The modified acrylic copolymer may comprise, by weight based on the weight of the modified acrylic copolymer, structural units of acrylic acid, methacrylic acid, or mixtures thereof, in an amount of 20% or more, 30% or more, 40% or more, 50% or more, 60% or more, or even 70% or more, and at the same time, 99% or less, 95% or less, 90% or less, or even 85% or less. "Unsaturated fatty acid ester" herein refers to an ester product of an unsaturated fatty acid and an alcohol. The alcohol can be any monohydric, dihydric, or polyhydric alcohol that is capable of condensing with the unsaturated fatty acid to form the corresponding unsaturated fatty acid ester. Typically, the alcohol contains at least one carbon atom. Typically, the alcohol contains less than 20 carbon atoms, less than 12 carbon atoms, or less than 8 carbon atoms. The carbon atoms may be arranged in a straight-chain or branched structure, and may be substituted with a variety of substituents, such as alkyl, cycloalkyl, monocyclic aromatic, arylalkyl, alkylaryl, hydroxyl, halogen, ether, ester, aldehyde and keto substituents. Preferably, the alcohol is a straight-chain or branched $C_1$-$C_{12}$ alkanol. A preferred alcohol is the trihydric alcohol glycerol, the fatty acid esters of which are known as "glycerides." Other preferred alcohols include methanol and ethanol. Unsaturated fatty acid esters useful in the present invention can be obtained from oils such as linseed, tung, castor, dehydrated castor, soybean, tall, sunflower, and corn. Preferably, the unsaturated fatty acid ester is derived from a $C_8$-$C_{25}$ unsaturated fatty acid segment and a $C_1$-$C_{12}$ alcohol segment. Suitable unsaturated fatty acid esters may include monounsaturated fatty acid esters formed from palmitoleic acid, oleic acid, or caproleic acid; di-unsaturated fatty acid esters formed from linoleic acid; tri-unsaturated fatty acid esters formed from linolenic acid or eleosteric acid, or mixtures thereof. Preferred fatty acid ester is colleseed oil, castor oil, sulphated castor oil, soybean oil, palm oil, olive oil, or a mixture thereof. The modified acrylic copolymer may comprise, by weight based on the weight of the modified acrylic copolymer, structural units of the unsaturated fatty acid ester in an amount of from 1% to 50%, from 3% to 45%, from 6% to 40%, or from 10% to 30%. The acrylic monomer useful for preparing the modified acrylic copolymer may also comprise one or more multiethylenically unsaturated monomer. The multiethylenically unsaturated monomer may include those described in the emulsion polymer section above, particularly allyl methacrylate. The obtained modified acrylic copolymer may comprise, by weight based on the weight of the modified acrylic copolymer, structural units of the multiethylenically unsaturated monomer in an amount of from zero to 10%, from 0.05% to 5%, from 0.1% to 3%, or from 0.15% to 2%. Polymerization process for preparing the modified acrylic copolymer can be conducted as the emulsion polymerization described in the emulsion polymer section above.

The waterborne resin useful in the present invention may have a number average molecular weight of 20,000 g/mol or less, for example, 19,000 g/mol or less, 18,000 g/mol or less, 17,000 g/mol or less, 16,000 g/mol or less, 15,000 g/mol or less, 14,000 g/mol or less, 13,000 g/mol or less, 12,000 g/mol or less, 11,000 g/mol or less, 10,000 g/mol or less, 9,000 g/mol or less, 8,000 g/mol or less, 7,000 g/mol or less, 6,000 g/mol or less, or even 5,000 g/mol or less. Molecular weight may be measured by GPC as described in the Examples section below.

The aqueous polymer composition of the present invention may comprise the waterborne resin in an amount of 0.7% or more, 0.8% or more, 0.9% or more, 1.0% or more, 1.2% or more, 1.5% or more, 1.8% or more, or even 2% or more, and at the same time, 7.8% or less, 7.7% or less, 7.6% or less, 7.5% or less, 7.4% or less, 7.3% or less, 7.2% or less, 7% or less, 6.8% or less, 6.5% or less, 6.2% or less, 6% or less, 5.8% or less, 5.5% or less, 5.2% or less, or even 5% or less, by dry weight based on the total dry weight of the emulsion polymer and the waterborne resin.

The aqueous polymer composition of the present invention may comprise ammonia and/or the amine in an amount of 0.005% or more, 0.01% or more, 0.02% or more, 0.03% or more, or even 0.04% or more, and at the same time, 5% or less, 4% or less, 2% or less, 1% or less, 0.8% or less, or even 0.7% or less, by weight based on the total dry weight of the emulsion polymer and waterborne resin. The aqueous polymer composition further comprises water, for example, in an amount of from 30% to 90%, from 40% to 80%, from 50% to 70%, or from 55% to 60%, by weight based on the total weight of the aqueous polymer composition.

The aqueous polymer composition of the present invention may optionally comprise one or more dryer. "Dryer" herein refers to a reaction product of a metal hydroxide and a fatty acid. The dryer can promote crosslinking of a waterborne epoxy ester. Suitable dryers may include, for example, cobalt 2-ethylhexanoate, cobalt naphthenate, manganese naphthenate, or mixtures thereof. The aqueous polymer composition may comprise the dryer in an amount of 15% or less, 12% or less, 10% or less, 9% or less, 8% or less, 7% or less, 5% or less, or even zero, by weight based on the dry weight of the waterborne epoxy ester. Preferably, the aqueous polymer composition is substantially free of the dryer, for example, in an amount of less than 4%, less than 3%, less than 2%, less than 1%, less than 0.5%, or even zero, by weight based on the dry weight of the waterborne epoxy ester.

The present invention also relates to a method of preparing the aqueous polymer composition by admixing the emulsion polymer, typically in an aqueous dispersion, with the waterborne resin. By simple blending the emulsion polymer and the waterborne resin ding, the method can provide easy processability and application.

The aqueous polymer composition of the present invention is particularly useful as a binder in coating applications. The present invention also relates to a coating composition comprising the aqueous polymer composition and optionally one or more pigment. The coating composition may comprise the aqueous polymer composition in an amount of from 5% to 95%, from 10% to 80%, or from 20% to 70%, by weight based on the total weight of the coating composition. "Pigment" herein refers to a material which is capable of materially contributing to the opacity or hiding capability of a coating composition. Such material typically has a refractive index greater than 1.8. Inorganic pigments typically include metal oxides. Examples of suitable pigments include titanium dioxide ($TiO_2$), carbon black, iron oxide, zinc sulfide, lemon chrome yellow, iron oxide black, or mixtures thereof. Organic pigments typically include prussian blue, organic pigment yellow, organic pigment red, anticorrosive pigments such as zinc phosphate, zinc molybdate, zinc oxide, aluminum tripolyphosphate, zinc phosphate molybdenum or modified zinc phosphate; or mixtures thereof. Carbon black may include acetylene black, channel black, furnace black, lamp black and thermal black. Preferred pigments are carbon black, barium sulfate, zinc phosphate or modified zinc phosphate, or mixtures thereof. More preferably, the pigment is carbon black.

The coating composition of the present invention may comprise one or more extender. "Extender" herein refers to a particulate inorganic material having a refractive index of less than or equal to 1.8 and greater than 1.3. Examples of suitable extenders include barium sulphate, talc, calcium carbonate, clay, calcium sulfate, aluminum silicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The coating composition may have a pigment volume concentration (PVC) of from zero to 55%, from 5% to 40%, or from 10% to 35%. PVC may be determined by the equation: $PVC = [Volume_{(Pigment+Extender)}/Dry\ Volume_{(coating\ composition)}] \times 100\%$.

The coating composition of the present invention may comprise one or more defoamer. "Defoamer" herein refer to a chemical additive that reduces and hinders the formation of foam. Defoamers may be silicone-based defoamers, mineral oil-based defoamers, ethylene oxide/propylene oxide-based defoamers, alkyl polyacrylates and mixtures thereof. Suitable commercially available defoamers may include, for example, TEGO Airex 901 W, TEGO Airex 902 W and TEGO Foamex 1488 polyether siloxane copolymer emulsions available from TEGO, BYK-022 and BYK-024 silicone deformer available from BYK, and mixtures thereof. The defoamer may be present, by weight based on the total weight of the coating composition, generally in an amount of from zero to 5%, from 0.05% to 3%, or from 0.1% to 2%.

The coating composition of the present invention may comprise one or more thickener, also known as "rheology modifier". Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is HEUR. The thickener may be present, by weight based on the total weight of the coating composition, in an amount of from zero to 5%, from 0.05% to 3%, or from 0.1% to 1%.

The coating composition of the present invention may comprise one or more wetting agent. "Wetting agent" herein refer to a chemical additive that reduces the surface tension of a composition, causing the composition to be more easily spread across or penetrate the surface of a substrate. Wetting agents may be polycarboxylates, anionic, zwitterionic, or non-ionic. Suitable commercially available wetting agents may include, for example, SURFYNOL 104 and SURFYNOL TG nonionic wetting agent based on an actacetylenic diol available from Evonik, BYK-190, TEGO-750W and TEGO-755W solution of a high molecular weight block polymer with pigment affinic groups available from BYK and Evonik, respectively, BYK-346 and BYK-349 polyether-modified siloxanes both available from BYK, or mixtures thereof. The wetting agent may be present, by weight based on the total weight of the coating composition, from zero to 5%, from 0.05% to 3%, or from 0.1% to 2%.

The coating composition of the present invention may comprise one or more coalescent. "Coalescent" herein refer to a slow-evaporating solvent that fuses polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present, by weight based on the total weight of the coating composition, from zero to 15%, from 0.5% to 8%, or from 2% to 5%.

The coating composition of the present invention may comprise one or more dispersant. Dispersants can be polyacrylic acid or polymethacrylic acid or maleic anhydride with various monomers such as styrene, acrylate or methacrylate esters, diisobutylene, and other hydrophilic or hydrophobic comonomers; salts thereof; or mixtures thereof. The dispersant may be present, by weight based on the total weight of the coating composition, in an amount of from zero to 5%, from 0.05% to 3%, or from 0.1% to 1%.

In addition to the components described above, the coating composition of the present invention may comprise any one or combination of the following additives: buffers, neutralizers, humectants, mildewcides, biocides, anti-skinning agents, colorants, flowing agents, anti-oxidants, plasticizers, leveling agents, adhesion promoters, anti-flash rust additives, and grind vehicles. These additives may be present in a combined amount of from zero to 10% or from 0.1% to 2%, by weight based on the total weight of the coating composition. The coating composition may also comprise water in an amount of from 30% to 90%, from 40% to 80%, or from 50% to 70% by weight of the coating composition.

The coating composition of the present invention can be prepared by admixing the aqueous polymer composition with the pigment, and optionally, other components described above. Components in the coating composition may be mixed in any order to provide the coating composition of the present invention. Any of the above-mentioned optional components may also be added to the coating composition during or prior to the mixing to form the coating composition. The pigments and/or extenders are preferably mixed with the dispersant to form a slurry of pigments and/or extender.

The coating composition of the present invention can be applied to, and adhered to, various substrates. Examples of suitable substrates include wood, metals, plastics, foams, stones, elastomeric substrates, glass, fabrics, concrete, or cementitious substrates. The coating composition is suitable for various applications such as marine protective coatings, general industrial finishes, metal protective coatings, automotive coatings, traffic paint, Exterior Insulation and Finish Systems (EIFS), wood coatings, coil coatings, plastic coatings, can coatings, architectural coatings, and civil engineering coatings. The coating composition is particularly suitable for metal protective coatings. The coating composition can be used as a primer, a topcoat, as one-coat direct-to-metal coating, or in combination with other coatings to form multi-layer coatings.

The coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry to form a film (this is, coating) at temperatures ranging from 0 to 35° C., or at an elevated temperature, for example, from 35 to 240° C.

The coating composition of the present invention can provide coatings made therefrom with improved corrosion resistance. The present invention also provides a method of improving corrosion resistance of a corrosion susceptible substrate, such as metal. The method comprises: providing the corrosion susceptible substrate, applying to the coating composition to the corrosion susceptible substrate (that is, coating onto the corrosion susceptible substrate the coating composition), and drying the coating composition to form a coated substrate. The corrosion resistance is characterized by a maximum creep at scribe of 2 mm, preferably, 1.7 mm or less, 1.5 mm or less, 1.2 mm or less, or even 1 mm or less, at a dry film thickness of 40-60 microns (μm) after at least 130 hours of exposure to salt spray. The coating composition of the present invention may also provide coatings with good early water resistance, as indicated by a blister rating of 10, 8F or 6F and a rust rating of 10, 9P, 9S or 9G. Corrosion resistance and early water resistance properties may be measured according to the test methods described in the Examples section below. The present invention also relates to an article made by the method. The present invention also relates to a process for preparing a coating. The process may comprise applying the coating composition to a substrate and drying the applied coating composition to form the coating with the properties defined above.

The coating composition of the present invention comprising the aqueous polymer composition as the binder dries faster, which enables higher product efficiency, as compared to conventional epoxy ester coating compositions (typically comprising an epoxy ester as the only binder). For example, when the coating composition applies to a substrate and dries for 1 to 6 hours, for example, 2 hours or less, the obtained two coated surfaces can be stacked or placed in contact with one another without coating damages when separating the two coated surfaces. In contrast, the conventional epoxy ester coating composition requires at least 24 hours of drying before coated surfaces can be stacked.

EXAMPLES

Some embodiments of the invention will now be described in the following Examples, wherein all parts and percentages are by weight unless otherwise specified.

Cyclohexyl methacrylate (CHMA) is available from BASF.

Styrene (ST) is available from Langyuan Chemical Co., Ltd.

Sulfated castor oil is available from Hydrior AG.

2-Ethylhexyl acrylate (2-EHA) is available from The Dow Chemical Company.

Methacrylic acid (MAA), acrylic acid (AA), allyl methacrylate (ALMA), isoascorbic acid (IAA), n-Dodecyl mercaptan (n-DDM), and $NaNO_2$ anti-flash rust additive are available from Sinopharm Chemical Reagent Co., Ltd.

Phosphoethyl methacrylate (PEM) is available from Solvay.

N-(2-Methacryloyloxyethyl) ethylene urea (MEUR) is available from Evonik.

Acetoacetoxyethyl methacrylate (AAEM) is available from Eastman.

DISPERBYK-190 dispersant and DISPERBYK-022 defoamer are available from BYK.

Printex 4 carbon black used as a pigment is available from Orion.

BS-115 $BaSO_4$ filler is available from GuangFu Jiancai.

OROTAN™ 731A dispersant, available from The Dow Chemical Company, is a hydrophobic polycarboxylic acid copolymer.

TEGO Airex 901w defoamer and TEGO Twin 4100 siloxane-based Gemini surfactant used as a wetting agent are both available from Evonik.

AMP 95 2-amino-2-methyl-1-propanol, available from Angus, is used as a neutralizer.

Texanol ester alcohol (3-Hydroxy-2,2,4-trimethylpentyl isobutyrate), available from Eastman, is used as a coalescent.

ACRYSOL™ RM-8W nonionic urethane rheology modifier is available from The Dow Chemical Company.

YG-EA670 epoxy ester resin (solids content: 70%-75%), available from YangGuang HuiDe (China), comprises waterborne epoxy ester resin ($M_n$: 1,954 g/mol).

RETAN™ 540 sulfated castor oil modified acrylic latex (solids content: 40%) (Mn: 4,687 g/mol) is available from The Dow Chemical Company.

OROTAN, RETAN and ACRYSOL are trademarks of The Dow Chemical Company.

The following standard analytical equipment and methods are used in the Examples and in determining the properties and characteristics stated herein:

Solids Content

The solids content of aqueous dispersions or waterborne resins was measured by weighting 0.7±0.1 g of a sample (wet weight of the sample is denoted as "W1"), putting the sample into an aluminum pan (weight of aluminum pan is denoted as "W2") in an oven at 150° C. for 25 minutes (min), and then cooling to room temperature (20-25° C.) and weighting the aluminum pan with the dried sample with total weight denoted as "W3". "W3-W2" refers to dry or solids weight of the sample. Solids content is calculated by (W3-W2)/W1*100%.

Salt Spray Resistance Test

A test coating composition was applied onto Q panels by using a 150 μm applicator. The resultant coated panels were first dried at 60° C. for 20 min, and then dried at room temperature and relative humidity (RH) of 50% for 7 days. A scribe mark in the shape of an "X" was made by cutting through the dry film on the coated panels using a razor blade. Then these panels were put into a salt spray chamber by exposure of the as prepared coated panels to a salt spray environment (5% sodium chloride fog) in accordance with ASTM B 117 (2011). After 130 hours of salt spray, the panels were taken out from the salt spray chamber and washed using deionized (DI) water. Then the blister and rust creep along the scribed mark were measured. Creep is the width of the largest blister or rust starting from either side of the scribed mark. The criteria for passing the test is a maximum creep of 2 mm after 130 hours of the salt spray test.

Early Water Resistance

Coated panels were prepared by applying a test coating composition onto Q panels (cold rolled steel) by a 150 μm applicator, and then drying the coating composition at room temperature and 50% RH for 2 hours. The obtained coated panels were dipped into DI water for 7 days at room temperature. Then the degree of rust and blister on the coated panels was evaluated and recorded according to ASTM D610 (2001) and ASTM D714-02 (2010), respectively. The panels with blister rating of 10, 8F or 6F and rust rating of 10, 9P, 9S or 9G are acceptable.

GPC Analysis for Waterborne Epoxy Esters and Emulsion Polymers

GPC analysis was performed generally by Agilent 1200. A sample was dissolved in tetrahydrofuran (THF)/formic acid (FA) (5%) with a concentration of 2 mg/mL with shaking for over one hour, stored at room temperature overnight, and then filtered through 0.45 μm polytetrafluoroethylene (PTFE) filter prior to GPC analysis. The GPC analysis was conducted using the following conditions:

Column: One PLgel GUARD column (10 μm, 50 mm×7.5 mm), Two Mixed B columns (7.5 mm×300 mm) in tandem; column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene narrow standards with molecular weights ranging from 2329000 to 580 g/mol, using polynom 3 fitness.

GPC Analysis for Unsaturated Fatty Acid Ester Modified Acrylic Copolymers

GPC analysis was performed generally by Agilent 1200. A sample was dissolved in dimethylformamide (DMF)/FA (2%) with a concentration of about 2 mg/mL, stored at room temperature overnight, and then filtered through 0.45 μm PTFE filter prior to GPC analysis. The GPC analysis was conducted using the following conditions:

Column: One PSS GUARD column, two PSS GRAM columns (8 mm×300 mm) in tandem; column temperature: 50° C.; mobile phase: DMF/FA (2%); flow rate: 1.0 mL/minute; Injection volume: 100 μL; detector: Agilent Refractive Index detector, 50° C.; and calibration curve: PL Polyethylene glycol narrow standards with molecular weights ranging from 542500 to 1010 g/mol, using polynom 3 fitness.

Synthesis of Castor Oil Modified Acrylic copolymer Dispersion A ("Castor Oil Modified PD-A")

Sulfated castor oil (255.92 g) and DI water (1,544 g) were added into a three-necked flask reactor. DI water (57 g) and 808 g of monomers (consisting of 84.6%AA/0.3%ALMA/15.1% MAA, by weight percent) were added with agitation to form a monomer mixture. APS (8.11 g) was dissolved into DI water (158.84 g) to form a catalyst solution. After heating the reactor to 90° C., the monomer mixture and the catalyst solution were added into the reactor for 180 min. Then the reactor was hold at 90° C. for additional 30 min. $FeSO_4$ solution (15.9 g, 0.08%) was added into the reactor. A solution of hydrogen peroxide (54.88 g, 5.7%) and a solution of IAA (103.6 g, 8%) were added into the reactor for 30 min. After cooling down to room temperature, NaOH solution (103 g, 3.2%) was added into the reactor and then the resultant emulsion was filtered with a 100-mesh filter to obtain a sulfated castor oil modified acrylic copolymer dispersion (pH value: 2.50, solids content: 33%, and $M_n$ of the resultant waterborne resin: 26,714 g/mol).

Synthesis of Polymer Dispersion 1 ("PD-1")

DI water (2,240 g), AR-1025 surfactant (25%, 336 g), ST (2,887 g), 2-EHA (2,451 g), CHMA (1,747 g), MAA (264 g), PEM (200 g), MEUR (50%, 128 g) and AAEM (232 g) were mixed together to produce a stable monomer emulsion. To DI water (5,064 g) under nitrogen atmosphere at 90° C., were added AR-1025 surfactant (25%, 214 g), ammonia (25%, 4.7 g) in DI water (20 g), the monomer emulsion (463 g) and APS (15 g) in DI water (96 g) followed by DI water (24 g) to form a reaction mixture. The remaining monomer emulsion, APS (9 g) in DI water (400 g) and ammonia (25%, 32 g) in DI water (400 g) were then added at 88° C. over 120 min followed by DI water (25 g). At the end of polymerization, $FeSO_4$ (0.11 g) in DI water (24 g) mixed with ethylenediamine tetraacetic acid (EDTA) sodium salt (0.14 g) in DI water (24 g), a solution of t-butyl hydroperoxide (t-BHP, 14.7 g) dissolved in DI water (160 g) and a solution of IAA (6.5 g) in DI water (160 g), a solution of t-BHP (12.4 g) in DI water (140 g) and a solution of IAA (2.3 g) in DI water (80 g) were all added at 60° C., and then ammonia (100 g) in DI water (24 g) was added at 50° C., to obtain an aqueous polymer dispersion.

Synthesis of Polymer Dispersion 2 ("PD-2")

DI water (2,240 g), AR-1025 surfactant (25%, 336 g), ST (3,119 g), 2-EHA (2,451 g), CHMA (1,747 g), MAA (264 g), PEM (200 g) and MEUR (50%, 128 g) were mixed together to produce a stable monomer emulsion. To DI water (5,064 g) under nitrogen atmosphere at 90° C., were added Fes-32 surfactant (31%, 162 g), ammonia (25%, 4.7 g) in DI water (20 g), the monomer emulsion (463 g) and APS (15 g) in DI water (96 g) followed by DI water (24 g) to form a reaction mixture. The remaining monomer emulsion, APS (9 g) in DI water (400 g) and ammonia (25%, 32 g) in DI water (400 g) were then added at 88° C. over 120 min followed by DI water (25 g). At the end of polymerization, $FeSO_4$ (0.11 g) in DI water (24 g) mixed with EDTA sodium salt (0.14 g) in DI water (24 g), a solution of t-BHP (14.7 g) dissolved in DI water (160 g) and a solution of IAA (6.5 g) in DI water (160 g), a solution of t-BHP (12.4 g) in DI water (140 g) and a solution of IAA (2.3 g) in DI water (80 g) were all added at 60 ° C., and then ammonia (100 g) in DI water (24 g) was added at 50° C., to obtain an aqueous polymer dispersion.

Synthesis of Polymer Dispersion 3 ("PD-3")

DI water (2,240 g), AR-1025 surfactant (25%, 336 g), ST (3,760 g), 2-EHA (2,451 g), CHMA (874 g), MAA (264 g), PEM (200 g), MEUR (50%, 128 g) and AAEM (232 g) were mixed together to produce a stable monomer emulsion. To DI water (5,064 g) under nitrogen atmosphere at 90° C., were added AR-1025 surfactant (25%, 214 g), ammonia (25%, 4.7 g) in DI water (20 g), the monomer emulsion (463 g) and APS (15 g) in DI water (96 g) followed by DI water (24 g) to form a reaction mixture. The remaining monomer emulsion, APS (9 g) in DI water (400 g) and ammonia (25%, 32 g) in DI water (400 g) were then added at 88° C. over 120 min followed by DI water (25 g). At the end of polymerization, $FeSO_4$ (0.11 g) in DI water (24 g) mixed with EDTA sodium salt (0.14 g) in DI water (24 g), a solution of t-BHP (14.7 g) dissolved in DI water (160 g) and a solution of IAA (6.5 g) in DI water (160 g), a solution of t-BHP (12.4 g) in DI water (140 g) and a solution of IAA (2.3 g) in DI water (80 g) were all added at 60° C., and then ammonia (100 g) in DI water (24 g) was added at 50° C., to obtain an aqueous polymer dispersion.

Synthesis of Polymer Dispersion 4 ("PD-4")

DI water (2,240 g), Fes-32 surfactant (31%, 271 g), ST (2,636 g), 2-EHA (2,451 g), CHMA (2,316 g), MAA (186 g), PEM (140 g) and MEUR (50%, 128 g) were mixed together to produce a stable monomer emulsion. To DI water (5,064 g) under nitrogen atmosphere at 90° C., were added RS-610 surfactant (25%, 214 g), ammonia (25%, 4.7 g) in DI water (20 g), the monomer emulsion (463 g) and APS (15 g) in DI water (96 g) followed by DI water (24 g) to form a reaction mixture. The remaining monomer emulsion, APS (9 g) in DI water (400 g) and ammonia (25%, 32 g) in DI water (400 g) were then added at 88° C. over 120 min followed by DI water (25 g). At the end of polymerization, $FeSO_4$ (0.11 g) in DI water (24 g) mixed with EDTA sodium salt (0.14 g) in DI water (24 g), a solution of t-BHP (14.7 g) dissolved in DI water (160 g) and a solution of IAA (6.5 g) in DI water (160 g), a solution of t-BHP (12.4 g) in DI water (140 g) and a solution of IAA (2.3 g) in DI water (80 g) were all added at 60° C., and then ammonia (100 g) in DI water (24 g) was added at 50° C., to obtain an aqueous polymer dispersion.

Synthesis of Polymer Dispersion 5 ("PD-5")

DI water (2,240 g), AR-1025 surfactant (25%, 336 g), ST (4,634 g), 2-EHA (2,451 g), MAA (264 g), PEM (200 g), MEUR (50%, 128 g) and AAEM (232 g) were mixed together to produce a stable monomer emulsion. To DI water (5,064 g) under nitrogen atmosphere at 90° C., were added AR-1025 surfactant (25%, 214 g), ammonia (25%, 4.7 g) in DI water (20 g), the monomer emulsion (463 g) and APS (15 g) in DI water (96 g) followed by DI water (24 g) to form a reaction mixture. The remaining monomer emulsion, APS (9 g) in DI water (400 g) and ammonia (25%, 32 g) in DI water (400 g) were then added at 88° C. over 120 min followed by DI water (25 g). At the end of polymerization, $FeSO_4$ (0.11 g) in DI water (24 g) mixed with EDTA sodium salt (0.14 g) in DI water (24 g), a solution of t-BHP (14.7 g) dissolved in DI water (160 g) and a solution of IAA (6.5 g) in DI water (160 g), a solution of t-BHP (12.4 g) in DI water (140 g) and a solution of IAA (2.3 g) in DI water (80 g) were all added at 60° C., and then ammonia (100 g) in DI water (24 g) was added at 50° C., to obtain an aqueous polymer dispersion.

Properties of the obtained aqueous dispersions of PD-1 to PD-5 are given in Table 1.

TABLE 1

Properties of Aqueous Polymer Dispersion

| Polymer Dispersion | pH | Solids content*, % | Particle size, nm |
|---|---|---|---|
| PD-1 | 7.5 | 41.50 | 90 |
| PD-2 | 7.66 | 42.50 | 81 |
| PD-3 | 9.51 | 41.81 | 84 |
| PD-5 | 8.85 | 42.50 | 84 |
| PD-4 | 7.79 | 42.47 | 81 |

*Solids content was measured according to the test method described above Example (Ex) 1-2 and 4-6 and Comparative (Comp) Exs 2-4, 7-8 and 10 Aqueous Polymer Compositions N,N-dimethyl ethanol amine (DMEA) (0.72 g) was added into YG-EA670 epoxy ester resin (measured solids content: 75%, 12 g) under stirring. After stirring for 5 min, water (12 g) was further added into the resulting mixture under stirring. After the feed of water was finished, the mixture was stirred by using a high speed disperser at 1,000 revolutions per minute (rpm) for 15 min to form a solution of the waterborne epoxy ester resin. Then, based on formulations given in Table 2, the aqueous polymer dispersions prepared above was added to the solution of the waterborne epoxy ester resin under stirring to form aqueous polymer compositions (i.e., admixture of emulsion polymer and waterborne epoxy ester).

Ex 3

RETAN 540 (2.72 g) was added into PD-1 (100 g) and mixed homogenously to obtain the admixture of Ex 3.

Comp Ex 5

Castor oil modified PD-A (3.22 g) was added into PD-1 (100 g) and mixed homogenously to obtain the admixture of Comp Ex 5.

Comp Ex 6

DMEA (1.58 g), oleic acid (5 g), and water (25 g) were mixed with stirring. The resultant mixture was added into PD-1 (68.42 g) to obtain Comp Ex 6.

Comp Ex 9

RETAN 540 (9.23 g) was added into PD-1 (100 g) and then mixed homogenously to obtain the admixture of Comp Ex 9.

TABLE 2

Aqueous Polymer Composition

| Aqueous Polymer Composition | General composition[1] | Solids content[2], % |
|---|---|---|
| Comp Ex 1 | PD-1 | 41.50 |
| Ex 1 | PD-1 and 5% by dry weight of YG-EA670 | 41.21 |
| Ex 2 | PD-1 and 7.5% by dry weight of YG-EA670 | 41.06 |
| Ex 3 | PD-1 and 2.5% by dry weight of RETAN 540 | 41.35 |
| Ex 4 | PD-1 and 2% by dry weight of YG-EA670 | 41.44 |
| Ex 5 | PD-1 and 1% by dry weight of YG-EA670 | 41.74 |
| Ex 6 | PD-3 and 5% by dry weight of YG-EA670 | 41.37 |
| Comp Ex 2 | PD-1 and 15% by dry weight of YG-EA670 | 40.65 |
| Comp Ex 3 | PD-2 and 5% by dry weight of YG-EA670 | 42.15 |
| Comp Ex 4 | PD-5 and 5% by dry weight of YG-EA670 | 42.15 |
| Comp Ex 5 | PD-1 and 2.5% by dry weight of Castor oil modified PD-A | 40.97 |
| Comp Ex 6 | PD-1 and 5% by weight of oleic acid | 38.36 |
| Comp Ex 7 | PD-1 and 8% by dry weight of YG-EA670 | 41.27 |
| Comp Ex 8 | PD-1 and 0.5% by dry weight of YG-EA670 | 41.48 |
| Comp Ex 9 | PD-1 and 8% by dry weight of RETAN 540 | 41.29 |
| Comp Ex 10 | PD-4 and 5% by dry weight of YG-EA670 | 41.36 |

[1]Percentage except Comp Ex 6 refers to dry weight of the waterborne resin relative to the total dry weight of the waterborne resin and polymer dispersion, where Dry Weight (waterborne resin) = Weight(waterborne resin) × Solids Content(waterborne resin); and Dry Weight(polymer dispersion) = Weight(polymer dispersion) × Solids Content(polymer dispersion). Percentage in Comp Ex 6 refers to weight of oleic acid relative to the total weight of oleic acid and the dry weight to polymer dispersion.
[2]Solids content of aqueous polymer composition was calculated based on concentrations and solids content of the waterborne resin and the polymer dispersion in the aqueous polymer composition.

Paint Formulations

The above obtained aqueous polymer compositions of Exs 1-6 and Comp Exs 1-10 were used as binders for preparing paint formulations of Paints 1-6 and Comp Paints 1-10, respectively, based on formulations given in Tables 3 and 4. Ingredients in the grind-1 and grind-2 were prepared using a high speed disperser (mixing speed: 800-3,000 rpm) to form the grind-1 and grind-2, respectively. The obtained grinds were mixed with the binder using a conventional lab mixer (mixing speed: 50-1,000 rpm), followed by mixing with other ingredients in the letdown stage. The specific binder composition, and loadings of the binder, Texanol and water used in the letdown stage for each paint formulation are listed in Table 4. Properties of the obtained paint formulations were evaluated according to the test methods described above and results are given in Table 4.

As shown in Table 4, after 130-hour salt spray resistance (SSR) testing, the paints comprising the binders of Exs 1-6 all demonstrated good corrosion resistance as indicated by the creep along the scribe no more than 2 mm. The binders of Exs 1-5 also provided paints with good early water resistance with ratings of 10. In contrast, the paint comprising PD-1 as the only binder (Comp Ex 1) failed to meet the creep requirement (i.e. ≤2 mm). The binders in which the emulsion polymers free of structural units of AAEM (Comp Ex 3), free of structural units of CHMA (Comp Ex 4), or comprising 30% CHMA (Comp Ex 10) all provided paints with worse anti-corrosion resistance properties as indicated by the creep along the scribe much wider than 2 mm. The binder of Comp Ex 5 comprising castor oil modified PD-A failed to provide paints with corrosion resistance to meet the creep requirement. The binder of Comp Ex 6 comprising 5% oleic acid failed to provide paints with desired corrosion resistance. The binders comprising 15%, 8% or 0.5% by dry weight YG-EA670 (Comp Exs 2, 7 and 8), or 8% by dry weight RETAN 540 (Comp Ex 9) all provided paints with the creep at scribe after the SSR test wider than 2 mm. As compared to the binder of Ex 1, the binder of Comp Ex 2 provided paints with poor early water resistance.

TABLE 3

Paint formulations

| Material | gram |
|---|---|
| Grind-1 | |
| Water | 32.00 |
| DISPERBYK-190 | 20.00 |
| DISPERBYK-022 | 8.00 |
| Carbon black | 20.00 |
| Water | 60.00 |
| Grind-2 | |
| Water | 14.00 |
| OROTAN 731A | 6.00 |
| TEGO Twin 4100 | 1.99 |
| AMP 95 | 0.56 |
| TEGO Airex 901W | 1.00 |
| BaSO$_4$ | 200.00 |
| Water | 74.30 |
| Letdown | |
| Binder | as given in table 4 |
| Texanol | as given in Table 4 |
| NaNO$_2$ (15% solution) | 9.2 |
| Water | as given in table 4 |
| ACRYSOL RM-8W | 2 |

TABLE 4

Paint Formulations (binder, Texanol and water) and Properties

| Paint formulations | Binder type (aqueous polymer composition) | Binder loading, g | Texanol, g | Water, g | 130 h creep at scribe, mm | Early water resistance |
|---|---|---|---|---|---|---|
| Comp Paint 1 | Comp Ex 1 | 662 | 52.25 | 0 | 3.5 | 10 |
| Comp Paint 2 | Comp Ex 2 | 662 | 44.36 | 7.89 | 10 | 5G |
| Comp Paint 3 | Comp Ex 3 | 662 | 49.59 | 2.3 | 3.5 | |

TABLE 4-continued

Paint Formulations (binder, Texanol and water) and Properties

| Paint formulations | Binder type (aqueous polymer composition) | Binder loading, g | Texanol, g | Water, g | 130 h creep at scribe, mm | Early water resistance |
|---|---|---|---|---|---|---|
| Comp Paint 4 | Comp Ex 4 | 662 | 49.59 | 2.3 | 5 | |
| Comp Paint 5 | Comp Ex 5 | 670.52 | 49.95 | 0 | >10 | |
| Comp Paint 6 | Comp Ex 6 | 715.84 | 49.95 | 0 | >10 | |
| Comp Paint 7 | Comp Ex 7 | 662 | 50.83 | 1.42 | 2.5 | |
| Comp Paint 8 | Comp Ex 8 | 662 | 51.99 | 0.26 | 4 | 10 |
| Comp Paint 9 | Comp Ex 9 | 662 | 50.83 | 1.42 | 6 | |
| Comp Paint 10 | Comp Ex 10 | 662 | 51.73 | 0.52 | 2.4 | |
| Paint 1 | Ex 1 | 662 | 49.95 | 2.3 | 1.5 | 10 |
| Paint 2 | Ex 2 | 662 | 49.95 | 2.3 | 2 | 10 |
| Paint 3 | Ex 3 | 664.12 | 49.95 | 0 | 2 | 10 |
| Paint 4 | Ex 4 | 662 | 51.21 | 1.04 | 1 | 10 |
| Paint 5 | Ex 5 | 662 | 51.73 | 0.52 | 1.5 | 10 |
| Paint 6 | Ex 6 | 662 | 51.21 | 1.04 | 1.7 | |

What is claimed is:

1. An aqueous polymer composition comprising,
   (A) an emulsion polymer comprising, based on the weight of the emulsion polymer,
   from 5% to 28% by weight of structural units of a cycloalkyl (meth) acrylate,
   from 0.1% to 10% by weight of structural units of an acetoacetoxy or acetoacetamide functional monomer,
   from 0.05% to 10% by weight of structural units of a phosphorous acid monomer, a salt thereof, or mixtures thereof,
   from zero to 10% by weight of an additional ethylenically unsaturated acid monomer, and
   structural units of an additional ethylenically unsaturated nonionic monomer; and
   (B) from 0.7% to 7.8% by dry weight of a waterborne resin comprising at least one fatty acid ester segment and having a number average molecular weight of 20,000 grams per mole or less, based on the total dry weight of the emulsion polymer and the waterborne resin.

2. The aqueous polymer composition of claim 1, wherein the waterborne resin is selected from the group consisting of a waterborne epoxy ester, an unsaturated fatty acid ester modified acrylic copolymer, or mixtures thereof.

3. The aqueous polymer composition of claim 2, wherein the unsaturated fatty acid ester modified acrylic copolymer comprises, by weight based on the weight of the unsaturated fatty acid ester modified acrylic copolymer, 20% or more of structural units of (meth)acrylic acid.

4. The aqueous polymer composition of claim 2, wherein the unsaturated fatty acid ester modified acrylic copolymer is a castor oil or sulphated castor oil modified acrylic copolymer.

5. The aqueous polymer composition of claim 2, wherein the waterborne epoxy ester comprises a reaction product of an unsaturated fatty acid and optionally an additional carboxylic acid-group-containing compound with an epoxy compound.

6. The aqueous polymer composition of claim 5, wherein the waterborne epoxy ester is a (meth)acrylic acid functionalized waterborne epoxy ester.

7. The aqueous polymer composition of claim 1, wherein the acetoacetoxy or acetoacetamide functional monomer is selected from the group consisting of acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, or mixtures thereof.

8. The aqueous polymer composition of aby-one of claim 1, wherein the cycloalkyl (meth)acrylate is selected from the group consisting of cyclohexyl methacrylate, cyclohexyl acrylate, methcyclohexyl acrylate, or mixtures thereof.

9. The aqueous polymer composition of claim 1, wherein the phosphorous acid monomer is selected from the group consisting of phosphoethyl methacrylate, phosphoethyl acrylate, allyl ether phosphate, or mixtures thereof.

10. The aqueous polymer composition of claim 1, wherein the emulsion polymer comprises, by weight based on the weight of the emulsion polymer, from 10% to 25% of structural units of the cycloalkyl (meth)acrylate; from 1.5% to 4% of structural units of the acetoacetoxy or acetoacetamide functional monomer; from 1.5% to 4% of structural units of the phosphorous-containing acid monomer, the salt thereof, or mixtures thereof; and structural units of the additional ethylenically unsaturated nonionic monomer; and optionally, from zero to 3% of structural units of an ethylenically unsaturated functional monomer having one or more functional groups selected from ureido, amide, amino, silane, hydroxyl, or combinations thereof.

11. The aqueous polymer composition of claim 1, comprising from 1% to 7.5% by dry weight of the waterborne resin, based on the total dry weight of the emulsion polymer and the waterborne resin.

12. The aqueous polymer composition of claim 1, wherein the emulsion polymer further comprises structural units of a polymerizable surfactant.

13. A method of preparing the aqueous polymer composition of claims 1 by admixing the emulsion polymer with the waterborne resin.

14. A coating composition comprising the aqueous polymer composition of claims 1 and optionally a pigment.

* * * * *